United States Patent [19]

Gladd

[11] Patent Number: 4,976,009
[45] Date of Patent: Dec. 11, 1990

[54] SMOKEHOUSE ASSEMBLY

[75] Inventor: Andrew J. Gladd, Plymouth, Mich.

[73] Assignee: Gladd Industries, Inc., Detroit, Mich.

[21] Appl. No.: 451,087

[22] Filed: Dec. 15, 1989

[51] Int. Cl.⁵ .............................................. A23B 4/04
[52] U.S. Cl. .................................. 452/198; 452/177; 99/477
[58] Field of Search ...................... 17/1 R, 51; 99/467, 99/470, 477

[56] References Cited

U.S. PATENT DOCUMENTS

| | | | |
|---|---|---|---|
| 1,715,625 | 6/1929 | Rind | 99/477 |
| 2,596,381 | 5/1952 | Doty | 99/477 |
| 4,029,004 | 6/1977 | Isenberg | 99/477 |
| 4,250,804 | 2/1981 | Saurenman | 99/477 |

Primary Examiner—Willis Little
Attorney, Agent, or Firm—Kenneth I. Kohn

[57] ABSTRACT

A multi-product meat processing assembly (10) of the type for smoking meat includes a plurality of sequentially adjacent chambers (12,14,16,18,20,22) and trolley assemblies (26) for carrying meats hung from racks (24) through the chambers. An indexing mechanism (54) positions the racks (24) at predetermined positions within each of the chambers. The assembly (10) also includes telescoping doorways (74) separating the chambers. The assembly (10) further includes a reversible fan (132) for moving air in two directions through each of the chambers.

19 Claims, 3 Drawing Sheets

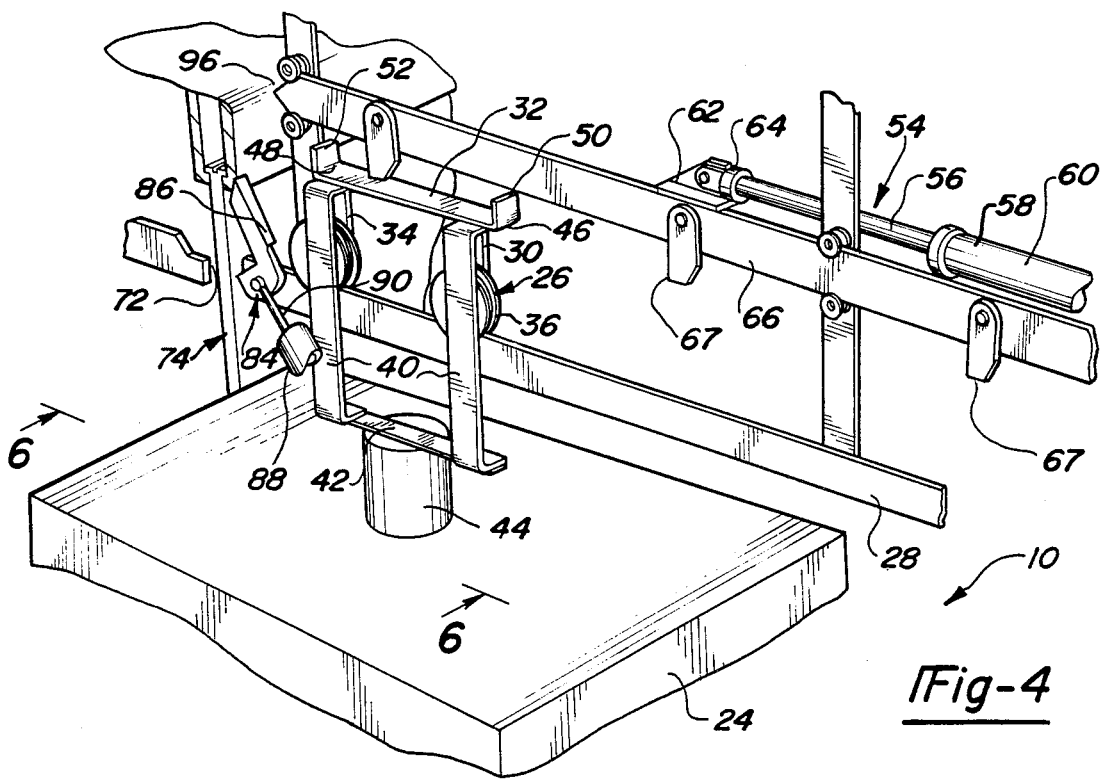
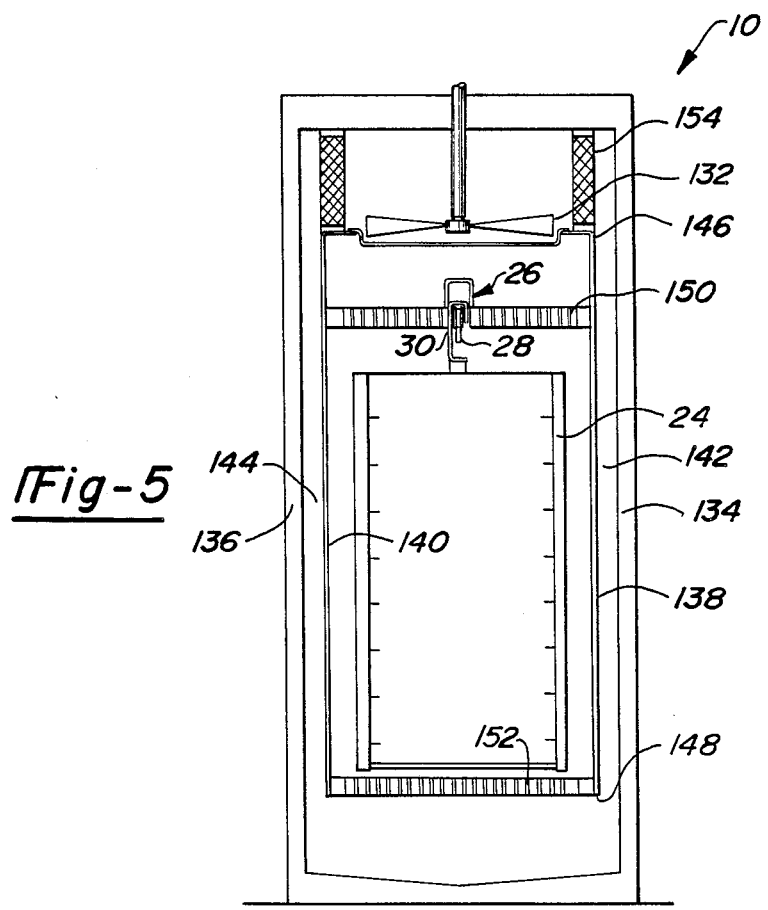

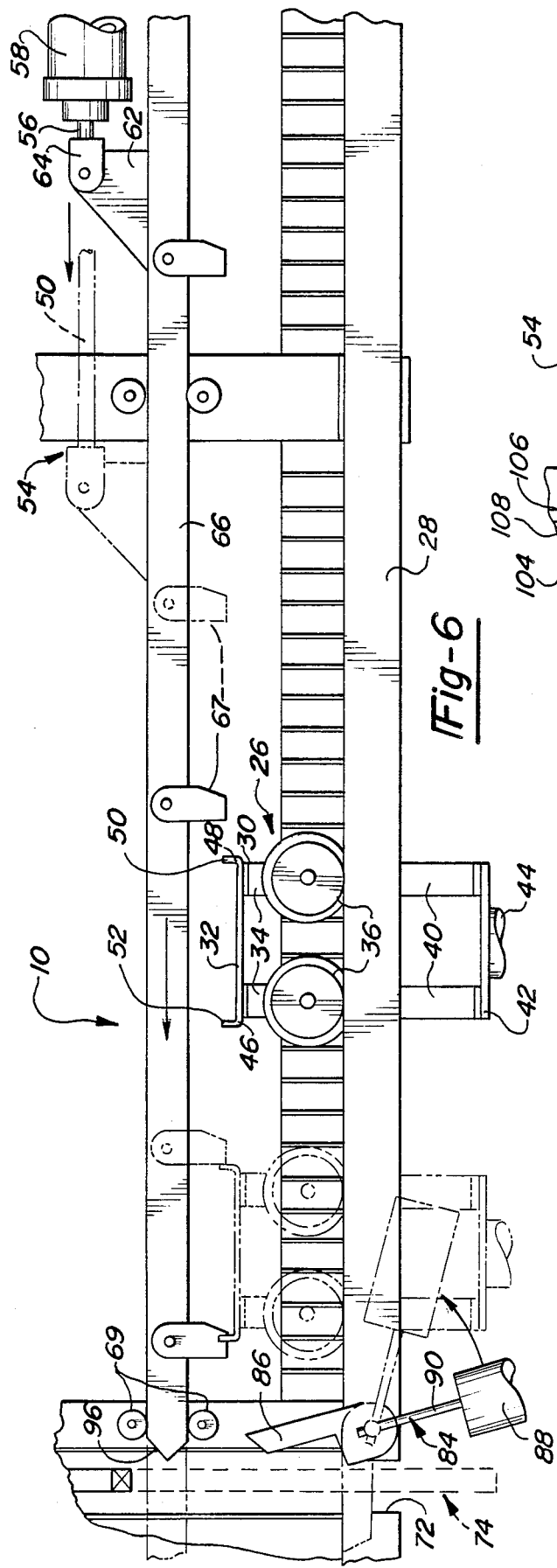
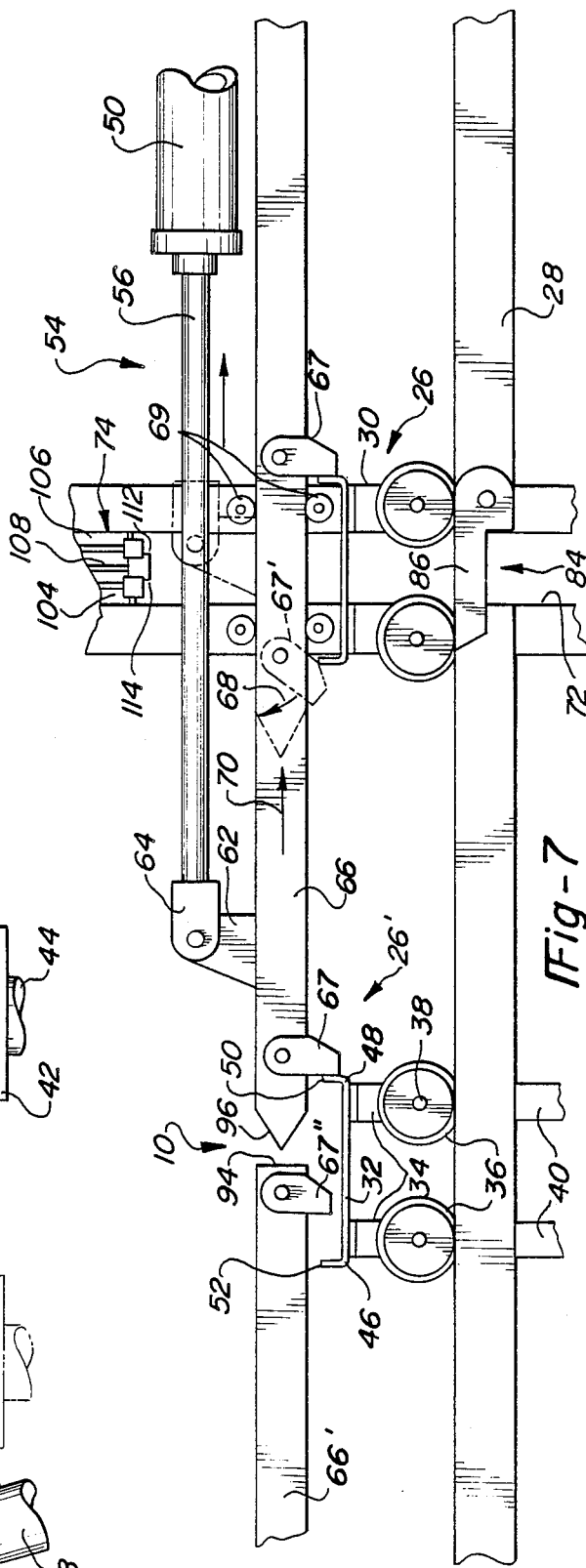

SMOKEHOUSE ASSEMBLY

TECHNICAL FIELD

The present invention relates to a multiproduct meat processing assembly of the type for smoking meat. More specifically, the present invention relates to smokehouse assemblies having multiple compartments therein for heating, chilling, smoking, and otherwise treating products such as meats.

BACKGROUND ART

Smokehouses generally include several chambers through which meat is conveyed to be treated. Typical smokehouses include heating chambers, chilling chambers, smoking chambers, holding chambers, and salt or brine wash chambers An example of such a smokehouse is disclosed in U.S. Pat. No. 1,371,305 to the inventor of the present invention and assigned to the assignee of the present invention.

It is desirable to convey a plurality of racks carrying meat thereon through a smokehouse simultaneously. In order to accomplish this result, the smokehouse must be adapted to treat various different types of meat for various periods in the various different chambers of the smokehouse Prior art assemblies utilize continuous belts and specific trolley mechanisms which would drop racks in certain chambers for certain periods of time and then pick up the racks and carry them to the next chamber Smaller smokehouses have found this assembly to be quite expensive. These prior art assemblies further do not provide for sufficient flexibility in the system.

The present invention provides a novel conveying means for a smokehouse which is adaptable to smaller smokehouses at a reduced cost.

Problems also arise in smokehouses due to hot spots in each of the heating chambers. Hot spots occur where heat is not even distributed through the chamber, resulting in inconsistent smoking and cooking of the meats throughout the chamber.

The present invention provides means for eliminating hot spots and evenly distributing heat and smoke throughout the chambers so as to evenly cook and smoke all of the meats within each chamber.

Further problems arise in the smoking process when various chambers are not isolated from adjacent chambers For example, it is highly undesirable for brine spray from a brine spray chamber to enter adjacent heating or cooling or holding chambers. The present invention provides means for isolating chambers while utilizing a minimum amount of adjacent space.

SUMMARY OF THE INVENTION

In accordance with the present invention there is provided a multi-product meat processing assembly of the type for smoking meat, the assembly including a plurality of sequentially adjacent chambers in which temperature, humidity, and smoking can be varied and transfer means for carrying meats through the chambers sequentially to predetermined positions in each of the chambers Indexing means indexes the transfer means at the predetermined positions within each of the chambers, the indexing means including reciprocating push-pull means having a neutral position for engaging the transfer means and an extended position for moving the transfer means to the sequentially next of the predetermined positions. The push-pull means is releasable from the transfer means to return to the neutral position to engage another one of the transfer means.

Another aspect of the present invention provides for the transfer means to include at least one track extending through the chambers and at least one trolley riding on the track for supporting a rack therefrom. The assembly further includes a plurality of doorways between each of the chambers and door means mounted in the doorways for reciprocating movement between open and closed positions for reversibly separating and isolating each of the chambers while also allowing movement of the trolleys between the adjacent chambers. The track includes retractable extension means for continuing the track through the doorways when the door means are in the open position and retracting out of the doorways when the door means is in the closed position.

Another aspect of the invention provides for the door means to include telescoping sections which fold into each other as the door means moves to the open position and extend from each other when the door means moves to the closed position.

Further, the present invention provides reversible fan means for first moving air through each of the chambers from the top end to the bottom end thereof and then in the reverse direction from the bottom end thereof to the top end thereof.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is a perspective view of a trolley and indexing means constructed in accordance with the present invention;

FIG. 5 is cross sectional elevational view of a representative chamber of the present invention;

FIG. 6 is a cross sectional elevational view taken substantially along lines 6-6 of FIG. 4; and FIG. 7 is a fragmentary elevational view of the operation of the indexing means of the present invention.

DETAILED DESCRIPTION OF THE INVENTION

Figure 1:
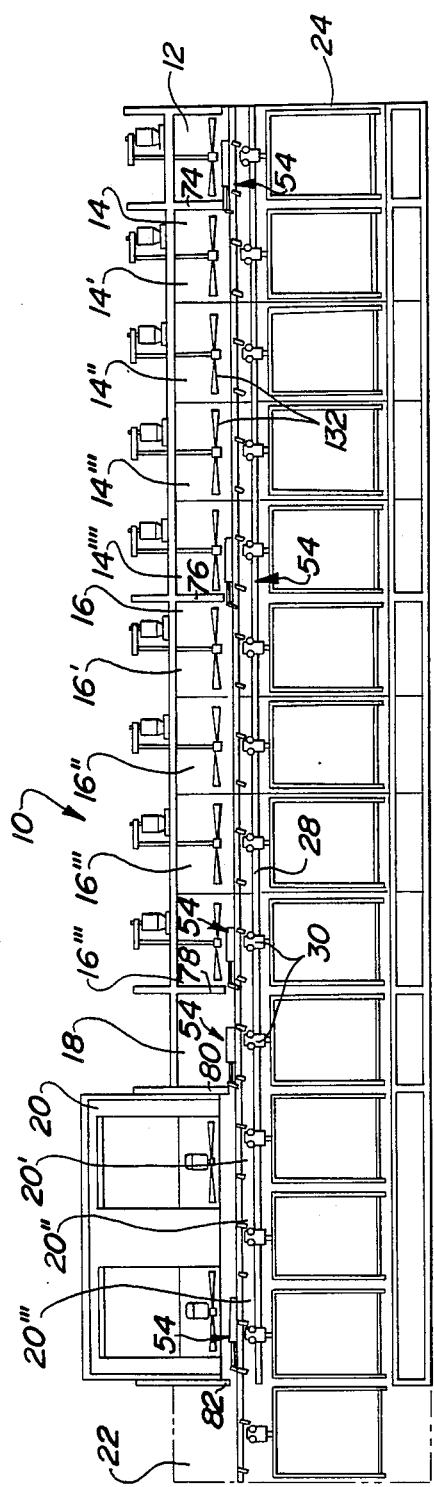
FIG. 1 is cross section elevational view of an assembly constructed in accordance with the present invention.

A multi-product meat processing assembly of the type for smoking meat constructed in accordance with the present invention is generally shown at 10 in the drawings. The assembly 10 includes a plurality of sequentially adjacent chambers in which temperature humidity and smoking can be varied, as shown in FIG. 1. The assembly 10 shown in FIG. 1 includes a loading zone 12, a first heat zone 14 having four index positions 14', 14'', 14''', 14'''' therein and a second heat zone 16 including four index positions 16', 16'', 16''', 16''''. The two heat zones 14, 16 maintain a heat temperature of 100° to 180° F. Beyond the second heat zone 16 is a steam cook and cold shower spray zone 18. A cold brine spray can be sprayed over the meat in this chamber. Beyond zone 18 is an air blast and chill water shower chamber 20 having three index positions 20', 20", 20''''. Beyond the air blast and chill water showers zone 20 is an unloading zone 22. Of course, various arrangements of zones can be constructed depending on the specific needs of particular meat processors.

A plurality of racks 24 of the type for holding various types of meats thereon is conveyed sequentially through each of the chambers 12, 14, 16, 18, 20, 22 as shoWn in FIG. 1. A trolley assembly generally shown at 26 provides transfer means for carrying meats through the chambers 12, 14, 16, 18, 20, 22 sequentially to the predetermined index positions in each of the chambers The trolley assembly 26 includes a track 28 shown in the FIGURES as a beam member extending through each of the chambers. A plurality of trolleys 30 ride on the track 28 and support the racks 24 therefrom.

Each trolley 30 includes a base portion 32 and legs 34 extending downwardly therefrom for supporting wheels 36 from axles 38. Arms 40 interconnect the base portion 32 with the racks 24. As shown in FIG. 4, the arms 34, 40 can be made from a single piece of bent metal sheeting formed into a U-shape about the wheels 36 and extending downwardly to a interconnecting plate 42 which is welded or otherwise fixedly secured to an upwardly projecting portion 44 of the trolley 24.

The base portion 32 of each trolley 30 includes a forward end 46 and a rearward end 48. The wheels 36 are mounted between the forward and rear ends 46, 48. Each trolley 30 includes a first wall 50 extending upwardly from the rear end 48 and a second wall 52 extending upwardly from the forward end 46.

The assembly 10 includes indexing means generally shown at 54 in FIGS. 4, 6 and 7 for indexing the trolley assemblies 26 at the predetermined positions (indicated by primed numbers in FIG. 1) within each of the chambers 12, 14, 16, 18, 20, 22. Generally, the indexing means 54 includes reciprocating push-pull means having a neutral position shown in solid lines in FIG. 6 and hatched lines in FIG. 7 for engaging the trolley assembly 26 and an extended position for moving the trolley assembly 26 to the sequentially next of the predetermined positions, as shown in hatch lines in FIG. 6 and in solid lines in FIG. 7. The push-pull means is releasable from the trolley assembly 26 to return back to the neutral position to engage another one of trolley assemblies 26 as detailed below.

More specifically, the aforementioned push-pull means includes a rod member or arm 56 which reciprocates into and out of a hydraulic cylinder 58. A reciprocating piston 60 is mounted for reciprocating movement within the piston 58 and is operatively connected to the arm 56. Thusly, the arm 56 is hydraulically actuated to extend from and retract into the piston cylinder 58. The arm 56 is connected to a bar member 66 by connecting plate 62 and adapter 64 mounted on the end of the arm 56. The bar member 66 is supported for reciprocating movement by guide rollers 69. The bar member 66 includes a plurality of retractable dogs 67 mounted thereon for simultaneously indexing the plurality of the trolleys 30 as described below. The are pivotable upwardly, as shown in FIG. 7 in a clockwise direction from a position where the dogs 67 are extending downwardly to a position where the dogs 67 are extending forwardly as indicated by the arrow 68. By means well known in the art, the dogs 67 cannot rotate in a counter-clockwise direction beyond the downwardly extending direction, as shown in FIG. 6. Thusly, a downwardly extending dog 67 can push a trolley assembly 26 by either engaging and pushing the first wall 50 or second wall 52 thereby either pushing the trolley assembly 26 or pulling the trolley assembly 26, respectively. Likewise, a dog 67 can be moved rearwardly, in the direction of arrow 70 over a trolley assembly 26 and not push or pull the trolley assembly 26 because the dog 67 will rotate clockwise as shown by arrow 68 in FIG. 7. In other words, the dog 67 can move the trolleys 26 in a forward direction but will retract relative to the bars 66 when they abut against a trolley 26 moving in the reverse direction.

The cylinder 58 provides hydraulic drive means for moving the arm 56 and connected bar 66 and further connected dogs 67 between the neutral position wherein the dog 67 is proximate to the cylinder 58, as shown in solid lines in FIG. 6 and in hatch line a in FIG. 7 and the extended position wherein the dog 67 is moved relatively away from the cylinder 58, as shown in hatch lines in FIG. 6. As discussed above, the dogs 67 are retractable to disengage from the trolley assembly 26 after the trolley assembly 26 is moved thereby.

As shown in FIG. 1, each chamber 12, 14, 16, 18, 20, 22 includes an indexing cylinder 58 and bar assembly. Thusly, a single cylinder 58 can move a single bar 66 having a plurality of dogs 67 mounted thereon for simultaneously moving a plurality of racks 24 within that chamber. The present invention provides an efficient and effective means for indexing a plurality of racks 24 moved through sequentially adjacent and aligned chambers The assembly 10 includes a plurality of doorways, exemplified by doorway 72 in FIG. 4, between each of the chambers 12, 14, 16, 18, 20, 22. Doors 74, 76, 78, 80, 82 are mounted in each of the doorways 72 for reciprocating movement between open and closed positions. In the closed positions, each of the doors reversibly separates and isolates each of the chambers while also allowing movement of the trolleys 26 between the adjacent chambers when the doors are in the open position. As discussed in the background art section, the addition of doors to the assembly is highly desirable to isolate each of the chambers and prevent cross contamination between chambers.

The track 28 includes retractable extension portions generally indicated at 84 in FIGS. 4, 6 and 7 for continuing the track 28 through the doorways 72 when the doors are in the open position, as shown in FIG. 7, and retracting out of the doorway 72 when the doors are in the closed position, as shown in FIGS. 4 and 6. More specifically, the retractable extension portions 84 include a track portion 86 pivotally mounted on the track member 28 for pivoting movement of the track portion 86 into and out of the doorway 72 A weight 88 operatively connected to the track portion 86 by rod member 90 biases the track portion 86 to pivot upwardly out of the doorway 72 as shown in FIGS. 4 and 6 and be moved downwardly into and completely across the doorway 72 upon rolling contact by one of the trolley assemblies 26 being moved by the indexing means, as shown in FIG. 7. Thusly, the assembly 10 provides for a continuous track for the trolley assemblies 26 while also allowing interruption of the tracks when the door assemblies are closed.

As stated above, each of the chambers 12, 14, 16, 18, 20, 22 includes at least one of the indexing assemblies 54. The bar member 66 having a dog 67 mounted near the end thereof as shown in FIG. 7, of each of the indexing assemblies 58 extends through the adjacent one of the doorways 72 when the arm 50 is in the extended position to move one of the trolley assemblies 26 across the doorway 72 as shown in FIG. 7. The bar member 66 is retracted back across the doorway 72 into the chamber containing the bar member 66 to clear the doorway 72 when the arm 56 in the retracted position. Thusly, the present invention provides an indexing assembly which can forward a trolley through a doorway yet provide for clearance of the indexing mechanism from the doorway 72 to allow the opening and closing of the door assembly 74.

Each of the chambers includes an entrance end and an exit end, the entrance end being to the right end of the chamber as shown in FIG. 1 and the exit end being to the left end of the chamber Each of the bar members includes a first end 94 spaced from the entrance end of each chamber to allow space for a second end 96 of the proceeding bar member 66 extending from the exit end of the adjacent chamber to extend into the entrance end of the chamber to move one of the trolley assemblies 26 in through the entrance end. As shown in FIG. 7 the end 94 of bar member 66, is spaced from the doorway 72 to allow bar member 66 to extend into the chamber containing bar member 66, and thereby move trolley assembly 26, into the assembly, as shown in solid lines. As bar member 66 moves back to the retracted position dog 67, rotates clockwise to clear the trolley assembly 26. Bar member 66, includes dog 67" at the end 94 thereof which will engage forward wall 52 and pull the trolley 26, to its next index position Thusly, walls 50 and 52 allow for the forward indexing of trolley 26 across doorway 72 by allowing for access of the front end 96 of bar member 66 during the indexing operation.

Figure 3:
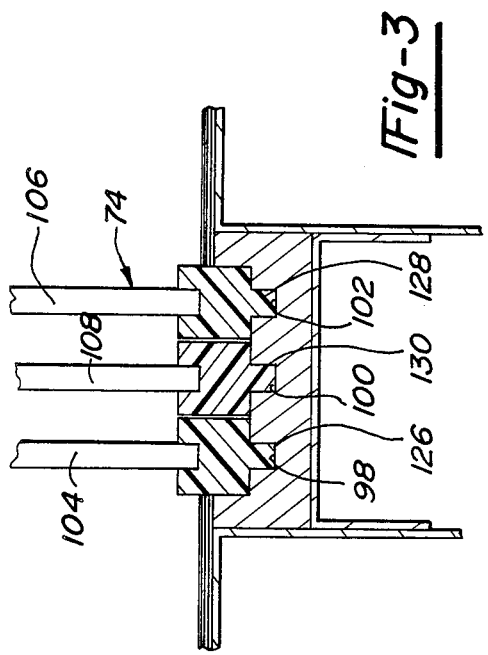
FIG. 3 is a cross sectional view taken substantially along lines 3-3 of FIG. 2.
Figure 2:
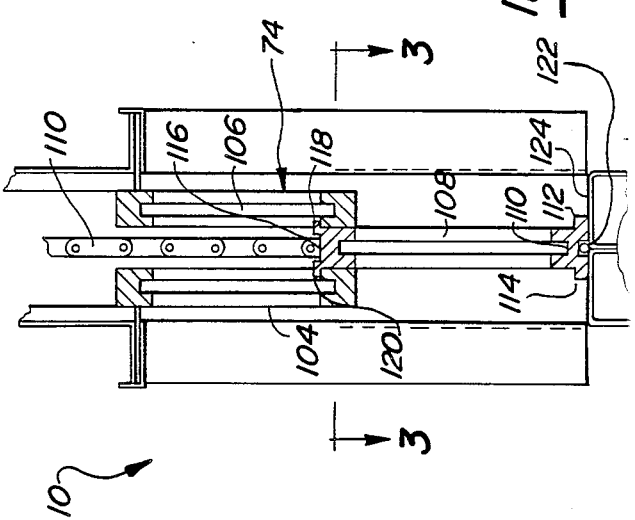
FIG. 2, is an enlarged cross sectional view of a door constructed in accordance with the present invention.

The assembly 10 includes telescoping door sections 74 which fold into each other as the door 74 moves to the open position and extend from each other when the door 74 moves to the closed position Each of the doorways 72 include tracks 98, 100, 102, as shown in FIG. 3, for guiding the movement of the door sections. More specifically, each door 74 includes outer door sections 104, 106 and an inner door section 108 operatively connected to the outer door sections 104, 106 for retracting movement into the outer door sections 104, 106. The door assembly 74 includes a chain mechanism 110 operatively connected to the inner door 108 for lifting the inner door section 108. The inner door 108 includes a bottom end 110 having a pair of flanges 112, 114 extending outwardly therefrom for abutting against the outer door sections 104, 106 to raise and lower the outer door sections 104, 106 therewith once the inner door section 108 is retracted into the outer door sections 104, 106, as shown in FIG. 7. In the lower closed position, the inner door section 108 includes a top end 116 having outwardly extending flanges 118, 120 perfecting a seal with the outer door sections 104, 106. The inner door section 108 also includes a collapsible hollow seal 122 for perfecting a seal with the floor 124 of the chamber containing the door. Thusly, the telescoping door assembly 74 perfects an isolation about each chamber when the door 74 is lowered to the closed position As shown in FIG. 3, each of the door sections 104, 106, 108 includes a projection 126, 128, 130, respectively extending therefrom seated in each of the tracks 98, 100, 102. The tracks 98, 100, 102 include corner abutments for limiting movement of each of the sections 104, 106, 108 thereby limiting the movement of the outer door sections 104, 106 to the position shown in FIG. 2 while allowing the inner door section 108 to extend all the way to the floor 124 of the chamber.

Each of the chambers has a top end and a bottom end. The chambers include a reversible fan 132 for first moving air through each of the chambers from the top end to the bottom end thereof and then in reverse from the bottom end to the top end thereof. This reversible fan assembly allows meat contained within the rack 24 to be more evenly heated and thereby preventing hot spots within the chamber.

Further, each chamber includes air diffuser means for diffusing the air steam emanating from the fans 132 in each of the chambers into a plurality of air jets over the length and width of each of the chambers. More specifically, each of the chambers includes side walls 134, 136, as shown in FIG. 5. Each chamber further includes internal sidewalls 138, 140 disposed within each of the sidewalls 134, 136 and defining a space 142, 144 therebetween. The internal side walls 138, 140 each have a top edge 146 spaced from the top end of each of the chambers and a bottom edge 148 spaced from the bottom end of the chamber. The diffuser means includes a first porous panel 150 mounted between the internal sidewalls 138, 140 proximate to the top edges 146 thereof and a second porous panel 152 mounted between the sidewalls 138, 140 adjacent the bottom edges thereof. The porous panels have a plurality of openings extending therethrough which diffuse the air moved by the fan 152 into a plurality of jets of air extending therethrough. These jets of air more evenly distribute the heated air or cooled air within the chamber and thereby more evenly heat or chill the meat on the racks 24. Thusly, the combination of the reversible fan 132 and diffuser panels 150, 152 eliminate hot spots which would otherwise unevenly smoke or heat or chill the meat hanging from rack 24.

As shown in FIG. 5, a heat exchange assembly 154 is mounted in the chamber above the fan 132. Air is move by the fan 132 in one direction from the heat exchange 154 downwardly through diffuser panel 152 and over the meat hanging from the rack 24. The air then travels through the diffuser panel 152 and back up around spaces 142, 144 and returns to the exchanger 154 for further recirculation. The fan 132 can then be run in the opposite direction following the same path of air flow thereby more evenly heating, cooling or smoking the meat hung from the rack 24.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A multi-product meat processing assembly (10) of the type for smoking meat, said assembly comprising a plurality of sequentially adjacent chamber (12, 14, 16, 18, 20, 22) in which temperature, humidity and smoking can be varied; transfer means (26) for carrying meats through said chambers (12, 14, 16, 18, 20, 22) sequentially to predetermined positions in each of said chambers; and indexing means (54) for indexing said transfer means (26) at said predetermined positions within each of said chambers, said indexing means (54) including reciprocating push/pull means having a neutral position for engaging said transfer means (26) to the sequentially next of said predetermined position, said push/pull means being releasable from said transfer means (26) to return to said neutral position to engage another one of said transfer means (26).

2. An assembly as set forth in claim 1 wherein said transfer means includes at least one track (28) extending through said chambers and at least one trolley (30) riding on said track (28) for supporting on rack (24) therefrom, said push/pull means including a reciprocating arm (56) having a retractable dog operatively mounted thereon for engaging said trolley and drive means (58) for moving said arm (56) and dog (67) between said neutral position wherein said dog (67) is proximate to said drive means (58) and said extended position wherein said dog (67) is moved relatively away from said drive means (58), said dog (67) being retractable to disengage from said trolley (26) after said trolley (26) is moved thereby.

3. An assembly as set forth in claim 2 wherein said drive means includes a hydraulic cylinder (58) having a reciprocating piston (60) mounted therein, said arm (56) being connected to said piston (60) for reciprocating movement therewith.

4. An assembly as set forth in claim 3 including doorways (72) between each of said chambers and door means mounted in said doorways (72) for reciprocating movement between open and closed positions for reversibly separating and isolating each of said chamber while also allowing movement of said trolleys between said adjacent chamber, said track (28) including retractable extension means (84) for continuing said track (28) through said doorways (72) when said door means are in said open position and retracting out of said doorway (72) when said door means is in said closed position 5. An assembly as set forth in claim 4 wherein said retractable extension means (84) includes a track portion (86) pivotally mounted for pivoting movement of said track portion (86) into and out of said doorway (72) and weight means (88) for biasing said track portion (86) to pivot upwardly out of said doorway (72) and be moved downwardly into and completely across said doorway (72) upon rolling contact by one of said trolleys (26) being moved by said indexing means (54).

6. An assembly as set forth in claim 5 wherein said indexing means (54) includes a bar member (60) operatively connected to said arm (56) and having a plurality of said retractable dogs (62) mounted thereon for simultaneously indexing a plurality of said trolleys (30).

7. An assembly as set forth in claim 6 wherein each of said trolleys (30) includes a base portion (32) having a plurality of trolley wheels (36) mounted thereon for riding on said track (28), said base portion (32) including a forward and rear end (46, 48) thereof, said wheels (36) being mounted therebetween, said trolley (30) including a first wall (52) extending upwardly from said rear end (48) for one of said dogs (67) to push said trolley and a second wall (52) extending upwardly from said front end (46) for one of said dogs to pull said trolley.

8. An assembly as set forth in claim 7 wherein each of said chambers includes at least one of said indexing means (54), said bar member (66) of each of said indexing means extending through said adjacent one of said doorway (72) when said arm (50) is in said extended position to move on of said trolleys (26) across said doorway (72) and retracting back across said doorway (72) into said chamber containing said bar member (66) to clear said doorway (72) when said arm (56) is in said neutral position.

9. An assembly as set forth in claim 8 wherein each of said chambers includes an entrance end and an exit end, said bar member (66) having a first end (94) spaced from said entrance end to allow space for said bar member (66) from said exit end of said adjacent chamber to extend into said entrance end of said chamber to move one of said trolleys (26) through said entrance end.

10. An assembly as set forth in claim 4 wherein said door means (74) includes telescoping sections which fold into each other as said door means moves to said open position and extend from each other when said door means (74) moves to said closed position.

11. An assembly as set forth in claim 10 wherein said doorways (72) include track: means (98, 100, 102) for guiding the movement of said section (140, 106, 108), each of said sections including projections (126, 128, 130) extending therefrom seated in said track means (98, 100, 102), said track means including abutment means for limiting the movement of each of said sections (104, 106, 108).

12. An assembly as set forth in claim 11 wherein said door means includes an outer door section (104, 106) and an inner door section (108) operatively connected to said outer door section (104, 106) for retracting movement into said outer door section (104, 106), said door means (74) including lifting means (110) operatively connected to said inner door section (108) for lifting said inner door section (108), said inner door section (108) including a bottom end (110) having a flange (112, 114) extending outwardly therefrom for abutting against said outer door section (104, 106) to raise and lower said outer door sections (104, 106) therewith once said inner door sections (108) is retracted into said outer door section (104, 106)

13. An assembly as set forth in claim 1 wherein each of said chamber has a top end and a bottom end, said assembly (10) including reversible fan means (132) for first moving air through each of said chambers from said top end to said bottom end thereof and then in reverse from said bottom end to said top end thereof.

14. An assembly as set forth in claim 13 including air diffuser means for diffusing the air stream from said fan means in each of said chambers into a plurality of air jets over the length and width of each of said chambers.

15. An assembly as set forth in claim 14, wherein each of said chambers includes sidewalls (134, 136) and internal sidewalls (138, 140) disposed within each of said sidewalls (134, 136) and defining a space (142, 144) therebetween, said internal sidewalls (138, 140) having a top edge (146) spaced from said top end of said chamber and a bottom edge (148) spaced from said bottom end of said chamber, said diffuser means including a first porous panel (150) mounted between said internal sidewalls (138, 140) proximate to said top edge (146) thereof and a second porous pane (152) mounted between said sidewalls (138, 140) adjacent said bottom edge (148) thereof, said porous panels having a plurality of openings extending therethrough.

16. A multi-product meat processing assembly of the type for smoking meat, said assembly comprising: a plurality of sequential adjacent chamber (12, 14, 16, 18, 20, 22) in which temperature, humidity and smoking can be varied; transfer means (26) for carrying meats through said chambers (12, 14, 16, 18, 20, 22) sequentially to predetermined positions in each of said chambers; and indexing means (54) for indexing said transfer means (26) at said predetermined positions within each of said chambers, said indexing means (54) for indexing said transfer means (26) at said predetermined positions within each of said chambers, said indexing means (54) including reciprocating push/pull means having a neutral position for engaging said transfer means (26) to the sequentially next of said predetermined position, said push/pull means being releasable from said transfer means (26) to return to said neutral position to engage another one of said transfer means (26); said transfer means (26) including at least one track extending through said chamber and at least one trolley riding on said track for supporting a rack therefrom, and a plurality of doorways between each of said chambers and door means mounted in said doorways (72) for reciprocating movement between open and closed positions for reversibly separating and isolating each of said chamber while also allowing movement of said trolleys between said adjacent chamber, said track (28) including retractable extension means (84) for continuing said track (28) through said doorways (72) when said door means are in said open position and retracting out of said doorway (72) when said door means is in said closed position.

17. A multi-product meat processing assembly of the type for smoking meat, said assembly comprising: a plurality of sequentially adjacent chambers (12, 14, 16, 18, 20, 22) in which temperature, humidity and smoking can be varied; transfer means (26) for carrying meats through said chambers (12, 14, 16, 18, 20, 22) sequentially to predetermined positions in each of said chambers; and indexing means (54) for indexing said transfer means (26) at said predetermined positions within each of said chambers, said indexing means (54) for indexing said transfer means (26) at said predetermined positions within each of said chambers, said indexing means (54) including reciprocating push/pull means having a neutral position for engaging said transfer means (26) to the sequentially next of said predetermined position, said push/pull means being releasable from said transfer means (26) to return to said neutral position to engage another one of said transfer means (26); transfer means; and door means having open and closed positions for separating each of said chambers, said door means including telescoping sections which fold into each other as said door means moves to said open position and extend from each other when said door means (74) moves to said closed position.

18. A multi-product meat processing assembly of the type for smoking meat, said assembly comprising: a plurality of sequentially adjacent chambers (12, 14, 16, 18, 20, 22) in which temperature, humidity and smoking can be varied; each of said chambers having a top and bottom end; transfer means (26) for carrying meats through said chambers (12, 14, 16, 18, 20, 22) sequentially to predetermined positions in each of said chambers; and indexing means (54) for indexing said transfer means (26) at said predetermined positions within each of said chambers, said indexing means (54) for indexing said transfer means (26) at said predetermined positions within each of said chambers, said indexing means (54) including reciprocating push/pull means having a neutral position for engaging said transfer means (26) to the sequentially next of said predetermined position, said push/pull means being releasable from said transfer means (26) to return to said neutral position to engage another one of said transfer means (26); and door means having open and closed positions for separating each of said chambers, said door means including telescoping sections which fold into each other as said door means moves to said open position and extend from each other when said door means (74) moves to said closed position; and reversible fan means (132) for first moving air through each of said chambers from said top end to said bottom end thereof and then in reverse from said bottom end to said top end thereof.

19. An assembly as set forth in claim 18 including air diffuser means for diffusing the air stream from said fan means in each of said chambers into a plurality of air jets over the length and width of each of said chambers.

* * * * *